Dec. 8, 1953  T. H. THOMAS  2,661,598
POWER UNIT FOR HYDRAULIC PRESSURE SYSTEMS
Filed Feb. 16, 1950
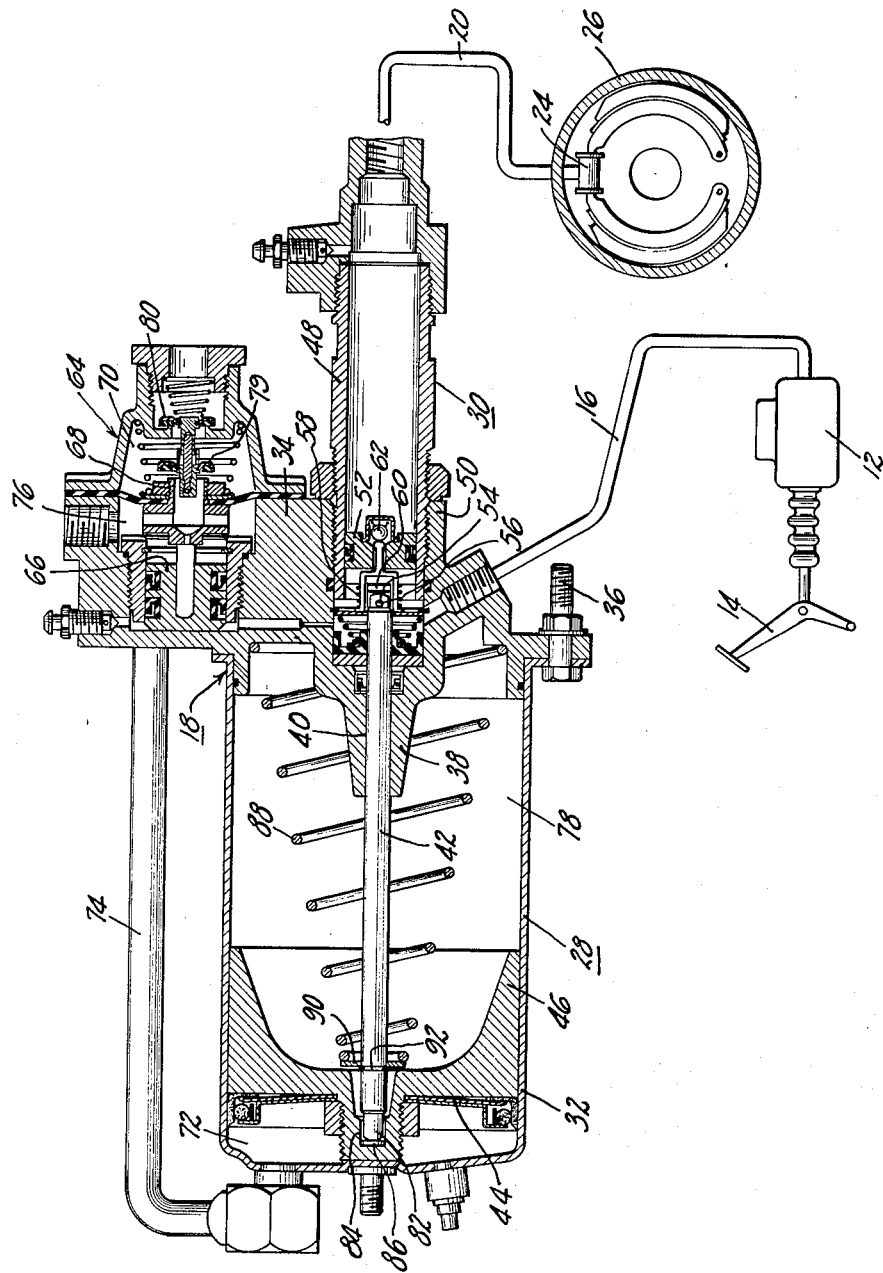
INVENTOR
THOMAS H. THOMAS
BY
T. J. Plante
ATTORNEY Patented Dec. 8, 1953

2,661,598

UNITED STATES PATENT OFFICE 2,661,598

POWER UNIT FOR HYDRAULIC PRESSURE SYSTEMS

Thomas H. Thomas, South Bend, Ind., assignor to Bendix Aviation Corporation, South Bend, Ind., a corporation of Delaware Application February 16, 1950, Serial No. 144,443

7 Claims. (Cl. 60—54.6)

1

This invention relates to a power unit, or booster, of the type which includes both a power cylinder and a hydraulic cylinder, the piston in the hydraulic cylinder being subjected to the pressure of the power cylinder piston, through the intermediary of a thrust rod.

A primary object of the present invention is to provide an improved guiding arrangement for the thrust rod and power piston. The arrangement proposed herein comprises a self-guiding power piston, a thrust rod guided independently of the power piston and having only abutting engagement therewith, and a return spring acting on the thrust rod to hold it in engagement with the power piston and thereby urge the piston toward retracted position.

Other objects and advantages of the present invention will become apparent during the course of the following description, reference being had therein to the accompanying drawing, in which:

The figure is a vertical sectional view of my improved power unit. The master cylinder, wheel cylinder, and interconnecting conduits of a hydraulic brake actuating system, with which the power unit is adapted to be used, are shown diagrammatically in the drawing.

Referring to the single figure, a conventional master cylinder 12, which is operated by a pedal lever 14, is hydraulically connected by means of a conduit 16 to the novel power, or booster, unit 18. At the outlet side, the power unit is connected by means of a conduit 20 to a wheel cylinder, or motor, 24, which is arranged to operate a brake 26. It will, of course, be readily apparent that the assistance of the power unit can be used in any type of control system. Its usefulness is not limited to braking systems, although that constitutes its most important field at present.

The power unit comprises a power cylinder 28 and a hydraulic cylinder 30. The power cylinder 28 may be of any preferred type, i. e. it may utilize whatever source of power is available. In the illustrated version of the invention, the power cylinder is of the differential air pressure type, and is specifically a compressed air power cylinder, in which the pressure differential across the piston is provided by having air at atmospheric pressure on one side of the piston and air at superatmospheric pressure on the other side of the piston.

The power cylinder casing consists of a cup-shaped shell 32, and a die cast end plate 34 secured to the open end of the shell by means of a plurality of fastening members 36. The end plate has an integral annular guide boss 38

2 which extends into the interior of the shell 32. The guide boss 38 provides a relatively long interior bearing surface 40, which constitutes substantially the sole support for a thrust rod 42. Power piston 44, which is reciprocably mounted in shell 32, has an integral annular guiding skirt 46 which extends toward the end plate 34. The arrangement is such that the axial space required in the power cylinder to accommodate the peripheral guiding skirt 46 also provides the axial space needed for the long rod bearing 40.

The hydraulic cylinder 30 comprises a tube 48 threaded into a boss 50 on the end plate 34. A piston 52 is reciprocably mounted in the hydraulic cylinder, and is connected to one end of thrust rod 42 by means of a lost motion pin-and-slot connection, constituted by a pin 54 which extends through a slightly over-sized hole 56 in the end of the rod. The pin 54 is loosely carried in a laterally extending opening in the rear portion of a piston 52, in which it is retained by means of a spring 58. The thrust exerted by rod 42 against hydraulic piston 52 is not carried by pin 54, but instead is exerted directly against hardened thrust element 60, which is embedded in the rear of the piston.

Piston 52 and the several elements which control the seating and unseating of ball valve 62 are described in detail, and certain novel features thereof are claimed, in application Serial No. 620,905, filed by Evue J. Ringer on October 8, 1945, now patent No. 2,598,604. The Ringer application also describes the construction and operation of a control valve similar to control valve 64 of the present application. Certain novel features of the control valve are claimed in application Serial No. 751,283, filed by Earl R. Price on May 29, 1947. The control valve of the present application differs from the Ringer and Price applications, in that it controls the application of superatmospheric pressure. Piston 66 is acted on by the hydraulic pressure developed in master cylinder 12, to urge valve seat 68 toward the right. Chamber 70 of the control valve communicates with chamber 72 of power cylinder 28 through pipe 74, and, as long as valve chamber 70 is connected to valve chamber 76 (which is open to the atmosphere), there is no pressure differential over power piston 44, chamber 78 being open to air at atmospheric pressure. When piston 66 is moved toward the right end of the control valve, valve seat 68 first engages valve element 79 to disconnect chambers 70 and 76, and thereafter unseats valve element 80 to admit compressed air to chambers 70 and 72.

The left end of thrust rod 42, instead of being tightly connected to power piston 44, is merely in abutting engagement with the power piston, and is permitted to adjust its position laterally with respect to the power piston. The left end 82 of the thrust rod extends, with peripheral clearance, into a recess 84 provided in the center of the power piston. The clearance between portion 82 of the thrust rod and recess 84 permits the slight radial movement of the left end of the rod which may be necessary to compensate for any misalignment between rod support 38 and piston support 46. A hardened thrust element 86 may be embedded in recess 84 to engage the end of the thrust rod.

A spring 88, located in power cylinder chamber 78, serves the dual purpose of (a) holding thrust rod 42 in abutting engagement with the end wall of recess 84, and (b) acting through rod 42 to return power piston 44 to released position, after a power stroke of the piston. Thrust rod 42 returns hydraulic piston 52 to released position, by pulling on pin 54. The left end of spring 88 acts on rod 42 through a collar 90 and a C-spring 92 mounted in a groove on the rod.

As is apparent from the foregoing description, thrust rod 42 is guided separately from either power piston 44 or hydraulic piston 52, and the thrust rod is able to have slight angular aligning movements with respect to the power piston and also with respect to the hydraulic piston. The left end of the thrust rod is held in engagement with the power piston solely by the return spring 88.

Although a particular embodiment of my invention has been described, it will be understood by those skilled in the art that the object of the invention may be attained by the use of constructions different in certain respects from that disclosed without departing from the underlying principles of the invention.

I claim:

1. A power unit for a hydraulic pressure system comprising a differential air pressure power cylinder which includes a cup-shaped shell and an end plate secured to the shell, said end plate having an integral small-diameter annular boss extending into the interior of the shell, a power piston reciprocable in the power cylinder, said power piston having an axial recess and an annular peripheral guiding skirt which extends toward the end plate, a hydraulic cylinder secured to the end plate, a hydraulic piston reciprocable in the hydraulic cylinder, a thrust rod which transmits force from the power piston to the hydraulic piston and which is guided solely by the annular boss on the end plate, one end of said rod extending, with peripheral clearance, into the recess in the power piston to engage the end wall of said recess, a lost motion pin-and-slot connection which secures the other end of the rod to the hydraulic piston whereby said other end may move radially of this piston, and a spring in the power cylinder which acts on the rod to urge it and the power piston toward retracted position.

2. A power unit for hydraulic pressure system comprising a differential air pressure power cylinder which has, at one end, an annular guide boss extending into the interior of the power cylinder, a power piston reciprocable in the power cylinder, said power piston having an axial recess and an annular peripheral guiding skirt which extends toward said boss, a hydraulic cylinder mounted on the end of the power cylinder having the guide boss, a hydraulic piston reciprocable in the hydraulic cylinder, a thrust rod which transmits force from the power piston to the hydraulic piston and which is guided solely by the guide boss, one end of said rod extending, with peripheral clearance, into the recess in the power piston to engage the end wall of said recess, and a spring in the power cylinder which acts on the rod to urge it and the power piston toward retracted position.

3. A power unit for a hydraulic pressure system comprising a power cylinder which has, at one end, an annular guide boss extending into the interior of the power cylinder, a power piston reciprocable in the power cylinder, said power piston having an axial recess and an annular peripheral guiding skirt which extends toward said boss, a hydraulic cylinder mounted on the end of the power cylinder having the guide boss, a hydraulic piston reciprocable in the hydraulic cylinder, a thrust rod which transmits force from the power piston to the hydraulic piston and which is guided solely by the guide boss, one end of said rod extending, with peripheral clearance, into the recess in the power piston to engage the end wall of said recess, and a spring which acts on the rod to hold it in engagement with the power piston.

4. A power unit for a hydraulic pressure system comprising a power cylinder which includes a cup-shaped shell and an end plate secured to the shell, said end plate having an integral small-diameter annular guide boss, a power piston reciprocable in the power cylinder, said power piston having an axial recess, a hydraulic cylinder secured to the end plate, a hydraulic piston reciprocable in the hydraulic cylinder, a thrust rod which transmits force from the power piston to the hydraulic piston and which is guided solely by the guide boss on the end plate, one end of said rod extending, with peripheral clearance, into the recess in the power piston to engage the end wall of said recess, a lost motion pin-and-slot connection which secures the other end of the rod to the hydraulic piston whereby said other end may move radially of this piston, and a spring in the power cylinder which acts on the rod to urge it and the power piston toward retracted position.

5. A power unit for a hydraulic pressure system comprising a power cylinder which has, at one end, an annular guide bearing, a power piston reciprocable in the power cylinder, said power piston having an axial recess, a hydraulic cylinder mounted on the end of the power cylinder having the guide bearing, a hydraulic piston reciprocable in the hydraulic cylinder, a thrust rod which transmits force from the power piston to the hydraulic piston and which is guided solely by the guide bearing, one end of said rod extending, with peripheral clearance, into the recess in the power piston to engage the end wall of said recess, and a spring in the power cylinder which acts on the rod to urge it and the power piston toward retracted position.

6. A power unit for a hydraulic pressure system comprising a differential air pressure power cylinder which includes a cup-shaped shell and an end plate secured to the shell, said end plate having an integral small-diameter annular boss extending into the interior of the shell, a thrust rod reciprocably received by said boss so that the rod ends project beyond the respective ends of said boss, a power piston having an axial recess and being reciprocably received by said shell, a hydraulic cylinder secured to the end plate, a hydraulic piston reciprocable in the hydraulic cylinder, one end of said rod having sliding contact with the bottom of said recess radially of said power piston, the other end of said rod having a lost motion connection with the hydraulic piston, said lost motion connection including means which will allow movement of said other end radially of said hydraulic piston while said other end is in abutting engagement therewith, and a spring in the power cylinder which acts on the rod to urge it and the power piston toward retracted position.

7. A power device comprising a differential air pressure power cylinder which includes a cup-shaped shell and an end plate secured to the shell, said end plate having an integral small-diameter annular boss extending into the interior of the shell, a thrust rod reciprocably received by said boss so that the rod ends project beyond the respective ends of said boss, said boss being the sole means for guiding said rod, a power piston having an axial recess and being reciprocably received by said shell, one end of said rod having sliding contact with the bottom of said recess radially of said power piston, the other end of said rod being adapted to have a radially shiftable thrust engagement with a hydraulic piston, and a spring in the power cylinder which acts on the rod to urge it and the power piston toward retracted position.

THOMAS H. THOMAS.

References Cited in the file of this patent

UNITED STATES PATENTS

| Number | Name | Date |
|---|---|---|
| 1,978,667 | Breese | Oct. 30, 1934 |
| 2,229,247 | Kamenarovic | Jan. 21, 1941 |
| 2,372,014 | Rockwell | Mar. 20, 1945 |
| 2,467,517 | Almond | Apr. 19, 1949 |
| 2,474,738 | Hollerith | June 28, 1949 |
| 2,536,461 | Price | Jan. 2, 1951 |